United States Patent [19]
Jacobs

[11] 3,802,490
[45] Apr. 9, 1974

[54] AUTOMOBILE HEATING AND AIR CONDITIONING SYSTEM

[75] Inventor: James W. Jacobs, Dayton, Ohio

[73] Assignee: General Motors Corporation, Detroit, Mich.

[22] Filed: Mar. 27, 1972

[21] Appl. No.: 238,374

[52] U.S. Cl................ 165/23, 165/29, 165/108
[51] Int. Cl............................. B60h 3/04c
[58] Field of Search ..... 165/23, 29, 108, 17, 42–44; 62/80, 90

[56] References Cited
UNITED STATES PATENTS

| | | | |
|---|---|---|---|
| 3,183,962 | 5/1965 | Steinhagen et al. | 165/42 |
| 3,119,239 | 1/1964 | Sylvan | 62/90 |
| 3,467,176 | 9/1969 | Truman | 165/17 |

Primary Examiner—Charles Sukalo
Attorney, Agent, or Firm—K. H. MacLean, Jr.

[57] ABSTRACT

An automobile heating and air conditioning system with controls for operating the air conditioning compressor under low ambient temperature conditions without frost accumulating on the evaporator. A heater core and evaporator core are enclosed in duct means for drawing air from the passenger compartment, heating or cooling the air and passing the air back into the passenger compartment. Under low ambient temperature conditions, damper doors are pivoted to direct heated air from the heater through the evaporator to prevent frost formation. The dampers are controlled by temperature or pressure responsive means which sense freezing conditions of the evaporator.

2 Claims, 11 Drawing Figures

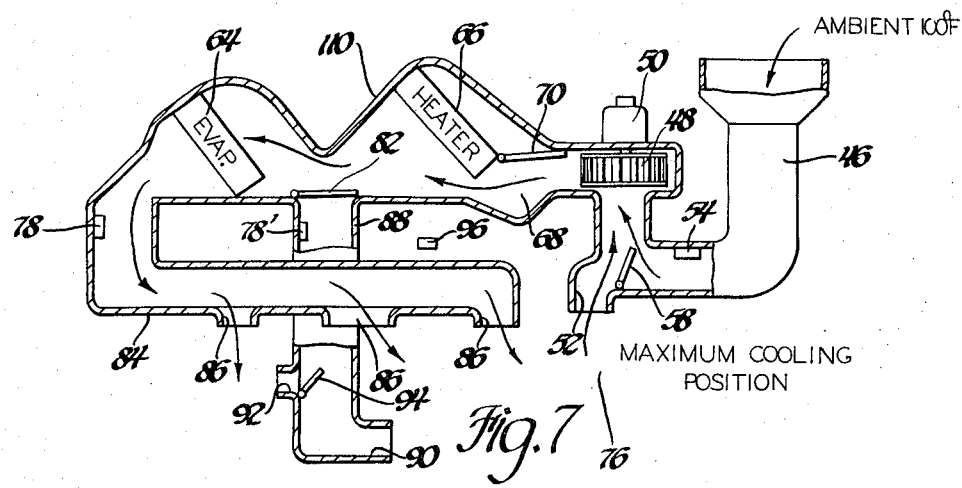
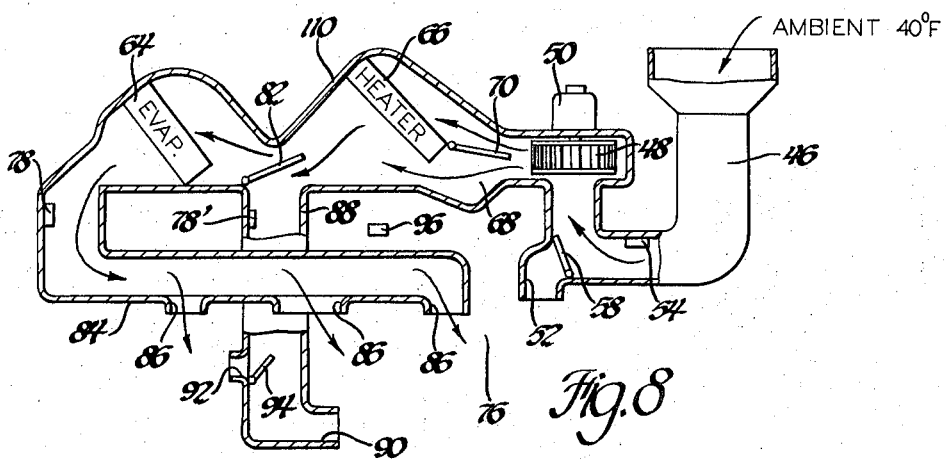
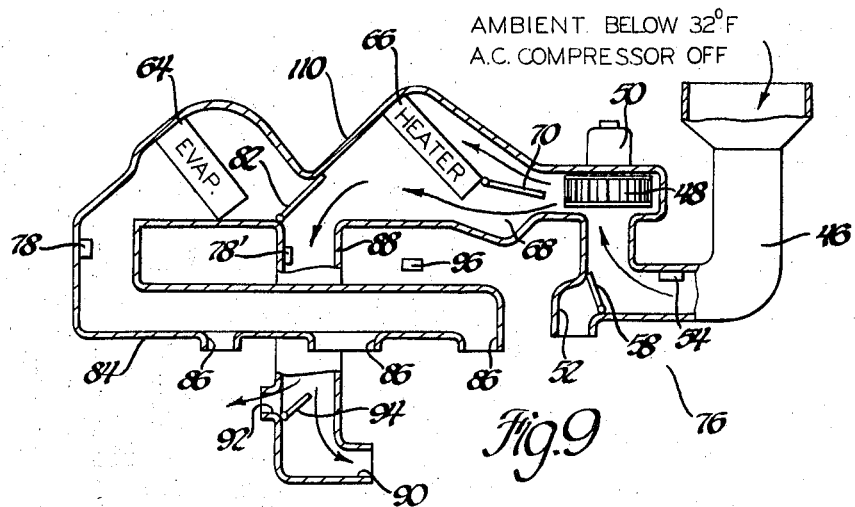

AUTOMOBILE HEATING AND AIR CONDITIONING SYSTEM

This invention relates to automobile heating and air conditioning systems and controls therefor.

Present air conditioning systems have controls which deactivate the system during operation in a low ambient temperature range. Usually the controls terminate operation of the air conditioning compressor. This is necessary because under low ambient temperature operation the capacity of the compressor to deliver refrigerant to the evaporator exceeds the ability of the evaporator under low temperature conditions to absorb enough heat from the air passing through to vaporize the refrigerant. Consequently, the evaporator temperature may fall below 32'F. and frost may accumulate on its fins which blocks air flow through the evaporator and further impairs the transfer of heat to the evaporator.

It is desirable to provide a heating and air conditioning system for an automobile with which the air conditioning compressor is operated continually at low ambient temperatures. Continuous operation of the compressor is desirable for several reasons, one being the de-humidifying of air passing through a cooled evaporator. Another advantage is the elimination of a cycling control of the compressor as is done in some air conditioning systems to prevent frost accumulation on the evaporator. The cycling off and on of the compressor is objectionable to many people because of engine speed changes and vibrations.

The present heating and air conditioning system has a simple condition responsive control which senses freezing conditions of the evaporator. The control moves damper doors in an air passage which contains the heater and the evaporator to direct heated air through the evaporator. This counteracts the drop in evaporator temperature which is caused by an excess of compressor capacity over the limited ability of the evaporator to absorb heat at a given low ambient temperature.

Therefore, an object of the present invention is to provide an automobile heating and air conditioning system which is adapted to be operated at low ambient temperatures without frost accumulating on the evaporator.

A still further object of the invention is to provide an automobile heating and air conditioning system utilizing evaporator condition responsive controls to direct heated air to the evaporator for preventing the evaporator temperature from falling below 32°F.

A still further object of the invention is to provide an automobile heating and air conditioning system utilizing air flow control means which sense a freezing condition of the evaporator which can cause frost accumulation thereon and directs heated air from the heater through the evaporator to prevent frost accumulation.

Still further objects and advantages of the present invention will be readily apparent from the following detailed description, reference being had to the following drawings.

IN THE DRAWINGS:

FIGS. 7–9 are like FIGS. 3-6 and illustrate another embodiment of the heating and air conditioning system having the present air flow controls.

Figure 1:
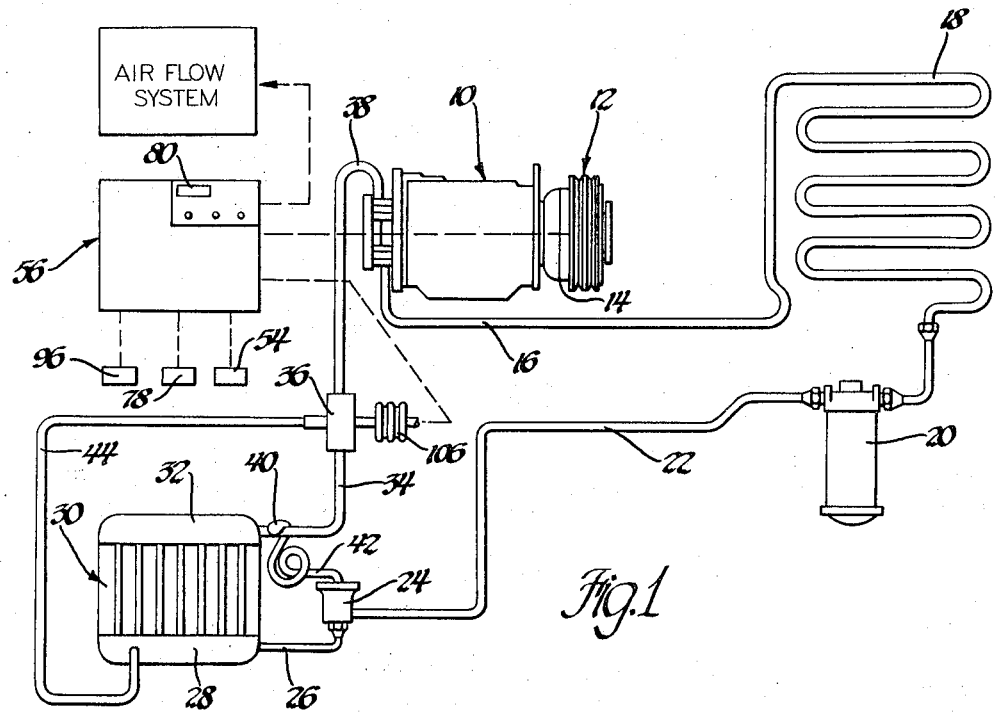
FIG. 1 is a schematic illustration of an automobile air conditioning system including the present air flow control.

In FIG. 1 of the drawings, an air conditioning system is shown including a refrigerant compressor 10. Compressor 10 is adapted to be driven by the crankshaft of an internal combustion engine by belts which engage a pulley assembly 12. The pulley 12 is connected by a clutch assembly 14 to the drive shaft of the compressor 10. Compressor 10 pumps refrigerant through a conduit 16 to a condenser 18 normally positioned in front of the automobile radiator for cooling and liquefying refrigerant. The refrigerant then flows from condenser 18 to a dryer-receiver assembly 20 where any vaporous refrigerant is separated from liquid refrigerant. Also, a small bag of dessicant material in the dryer-receiver absorbs moisture in the refrigerant system.

The liquid refrigerant flows from dryer-receiver 20 through a conduit 22 to the inlet of an expansion valve 24. The expansion valve 24 expands high pressure liquid refrigerant to a lower pressure. It then passes through conduit 26 into a lower portion 28 of an evaporator 30. In the evaporator 30, the liquid refrigerant is boiled or evaporated as it absorbs heat from air passing through the evaporator. The vaporous refrigerant is collected in the upper portion 32 of the evaporator 30 and then passes through an outlet conduit 34 into a suction throttling valve 36. The valve 36 automatically restricts refrigerant flow from evaporator 30 to prevent the evaporator pressure from falling below a predetermined pressure corresponding to a freezing temperature. Refrigerant is next drawn through suction conduit 38 into the inlet of compressor 10.

The expansion valve 24 regulates the quantity of liquid refrigerant admitted into the lower portion 28 of evaporator 30 for desired cooling. It admits less refrigerant under low ambient temperature conditions to prevent flooding of evaporator 32 with liquid refrigerant when the heat load on the evaporator is relatively small and incapable of evaporating a large quantity of refrigerant. A thermal bulb 40 in heat transfer relation to the conduit 34 senses the refrigerant temperature at the evaporator outlet. A pressure signal developed by the outlet temperature moves a diaphragm within the expansion valve 24. The pressure is transmitted through capillary tube 42. The diaphragm is operably connected to a valve element in the expansion valve which regulates the quantity of refrigerant admitted to the evaporator 30. The refrigerant as it flows through valve 24 expands by passage through a relatively small port. An oil return conduit 44 extends between the lower portion 28 of the evaporator 30 and the outlet side of the suction throttling valve 36. This returns oil which collects in the evaporator to the compressor for lubricating purposes.

As previously explained, the suction throttling valve 36 restricts refrigerant flow from the evaporator 30 to prevent its pressure from decreasing below a predetermined level corresponding to 32°F. to prevent frost from forming on the evaporator. At ambient temperatures above about 60°F., the throttling valve satisfactorily performs this function. However, as the ambient temperature decreases to the 32°F. level, the suction throttling valve 36 becomes progressively less effective in preventing freezing temperatures of the evaporator. In the temperature range between 60°F. and 32°F., a level is reached at which the suction throttling valve 36 completely closes and the only refrigerant flowing into the suction line 38 is caused by leakage around the throttling valve. Below the temperature where this occurs, the suction throttling valve 36 is ineffective in controlling evaporator temperature.

Figure 2:
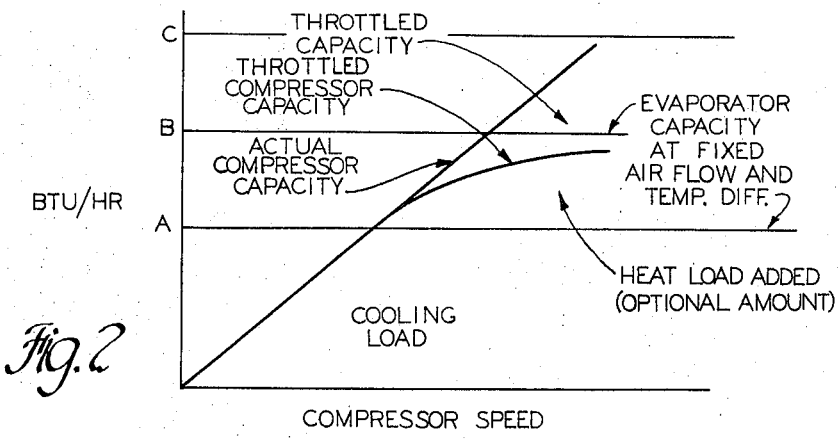
FIG. 2 is a plot showing the cooling performance of the sytem as measured by the cooling rate along the vertical axis and the compressor speed along the horizontal axis.

The effect of the aforedescribed components on the system's cooling capacity is illustrated in FIG. 2 which plots the cooling rate on the vertical axis against the compressor speed on the horizontal axis. As the compressor speed increases, the actual capacity of the compressor to deliver refrigerant to the evaporator increases proportionally. The horizontal lines at constant cooling values A and B represent the capacity of the evaporator to absorb heat from air passed through the evaporator at different ambient temperatures without frost formation. This evaporator cooling capacity is dependent on the temperature differential between air passing through the evaporator and the evaporator's fin temperature as well as the air flow rate through the evaporator. Line A represents operation of the evaporator at a relatively low ambient temperature. The evaporator cooling capacity is not dependent on compressor speed.

The area above the evaporator capacity line and below the actual compressor capacity line represents excess compressor cooling capacity which tends to cause the evaporator temperature to fall below 32°F. The suction throttling valve which closes to restrict refrigerant flow from the evaporator decreases the actual compressor efficiency as represented by the curved line labeled "Throttled Compressor Capacity." The area between the throttled compressor capacity line and the actual compressor line represents the cooling capacity lost by throttling. The throttling valve is not capable of reducing the compressor capacity below the evaporator capacity line A at low ambient temperature conditions. The present heating and air conditioning system includes air flow controls which directs heated air to the evaporator. A quantity of heat represented by the area between the evaporator capacity line A and the throttled compressor capacity line must be added to prevent evaporator freezing. This enables the compressor to be operated in a low ambient temperature condition without frost formation on the evaporator.

One embodiment of the present invention is shown in FIGS. 3-6 which illustrates air flow means for directing air through the evaporator and heater during different ambient temperature conditions. In the drawings, an air inlet passage 46 draws air from the exterior of the automobile to a blower fan 48 which is rotated by an electric motor 50. Also, an air inlet passage 52 introduces air from the automobile passenger compartment to the blower fan 48. A temperature sensing switch 54 in the air inlet 46 terminates compressor operation whenever the ambient temperature falls below 32°F. In FIG. 1, the switch 54 is shown connected to a control assembly 56 which is connected to clutch 14 to terminate compressor operation in response to the opening of switch 54. A pivotal air door 58 regulates the amount of recirculated air which is drawn from the passenger compartment through passage 52.

Figure 6:
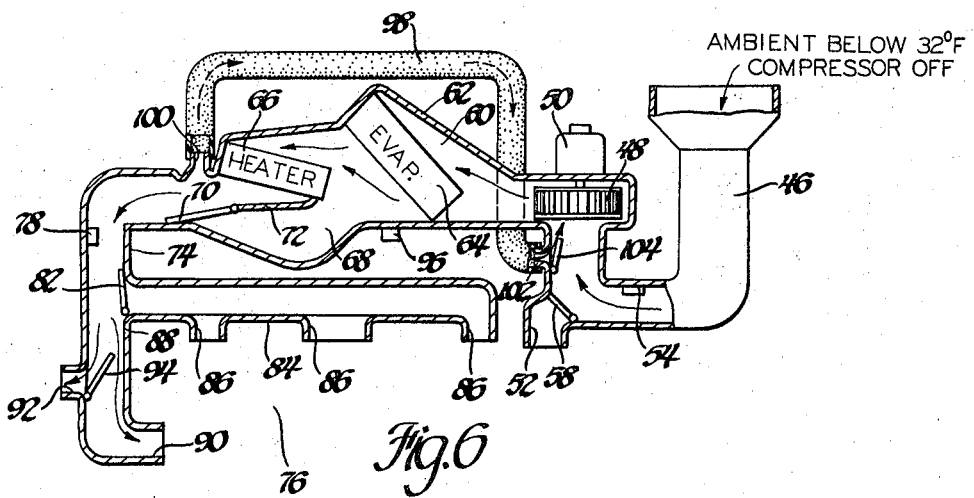

Air is discharged from the blower fan 48 through an air passage 60 formed by a duct 62. An evaporator 64 is positioned across the air passage 60 so that all the air must flow through the evaporator core as it passes through the duct 62. As the air passes through the evaporator, it is de-humidified and moisture is drained to the exterior of the automobile. Some air then passes through a heater core 66 which is warmed by coolant from the automobile engine. The heater core 66 is supported partially across the passage 60 and a bypass passage 68 is formed around the heater 66. Air from the evaporator 64 either flows through the heater core 66 or bypass 68. A modulating temperature door 70 which is pivotally mounted to a wall 72 varies the proportion of air which flows through heater 66 and which flows through bypass 68. When warmer air discharge temperatures are desired in the passenger compartment, door 70 is pivoted counterclockwise to cause most of the air to flow through the heater core 66 as shown in FIG. 6. Conversely, when cool air discharge temperatures are desired, air door 70 is pivoted to the position shown in FIG. 3 whereby practically all the air which is passed through evaporator 64 bypasses the heater 66.

Downstream from the heater 66, the air passes through an air distribution duct 74 into the passenger compartment which is indicated by the numeral 76. Air which passes into the air distribution duct 74 flows over an air discharge temperature switch 78. The switch 78 is also shown in FIG. 1 and is connected to the control assembly 56 which includes a manually set temperature dial 80 to select a desired temperature in the passenger compartment. The modulating temperature door 70 is then moved to a position which produces the desired temperature by vacuum elements (not shown).

Downstream from the switch 78, an air door 82 directs the air either through upper level ducts 84 for discharge through upper level outlets 86 or through a lower level duct 88 for discharge through a heater outlet 90 and a windshield defrost outlet 92. A defroster air door 94 regulates the proportion of heated air discharged through the outlets 90 and 92. Normally, it is desirable to introduce relatively cool air into the passenger compartment through the upper level outlets 86 and to introduce relatively warm air into the passenger compartment through the the lower level outlet 90.

The temperature in the passenger compartment 76 is sensed by a switch or sensor 96 which is connected as shown in FIG. 1 with the control assembly 56. Control assembly 56 receives the signals from sensors 54, 78 and 96 to control the operation of the heating and air conditioning system. Some of the functions performed by assembly 56 are activating compressor 10 by energizing clutch 14, positioning the temperature door 70, moving the air door 82 to direct the air discharge either through the upper level outlets 86 or the lower level outlets 90 and moving air door 58 to admit air to blower 48 from the passenger compartment.

A flexible hose 98 extends from an outlet 100 which is downstream from the heater 66 to an inlet 102 upstream from the blower fan 48. The resultant flow of heated air through the hose 98 is controlled by a heat recirculating door 104. The heat recirculating door 104 directs a portion of the heated air through the blower fan 48 and to evaporator 64. This places a heat load on the evaporator which prevents its temperature from falling below a freezing level during low ambient temperature operation, and thus preventing frost formation thereon. The position of the heat recirculating door 104 is controlled by a sensor 106 shown in FIG. 1 which is responsive to decreasing evaporator outlet pressure which corresponds to decreasing evaporator outlet pressure which corresponds to decreasing temperatures. Sensor 106 transmits a signal to control assembly 56 when the evaporator pressure falls below a predetermined level. When the control assembly 56 receives the signal from the sensor 106, it causes the air door 104 to open so that some air from the heater may flow through the hose 98 and into the blower fan 48 for warming the evaporator. Sensor 106 could also be temperature responsive rather than pressure responsive such as a bimetal type switch.

Figure 3:
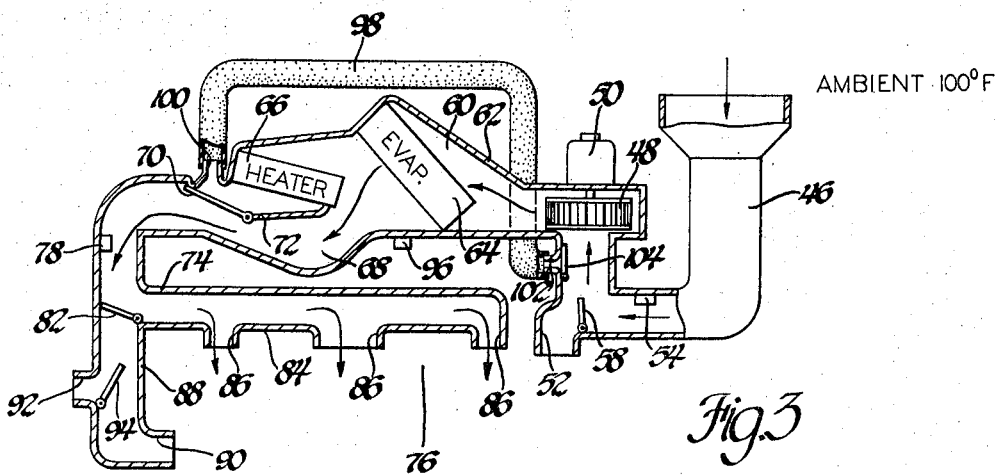
FIGS. 3–6 are sectioned horizontal views of the heating and air conditioning system having the present air flow controls.

When the ambient temperature is relatively great, as in FIG. 3, air is drawn to the blower fan 48 through the passage 46 and the air inlet 52. The air flows through the evaporator 64 where it is cooled and de-humidified and then flows through the bypass 68 into the air distribution duct 74. The air door 82 causes all the cooled air to pass through the upper level outlet 86. Under these high ambient temperature conditions, there is no need to reheat the evaporator because the heat load on the evaporator (or cooling capacity of the evaporator) is greater than the compressor's capacity. This would correspond to a line C in FIG. 2.

Figure 4:
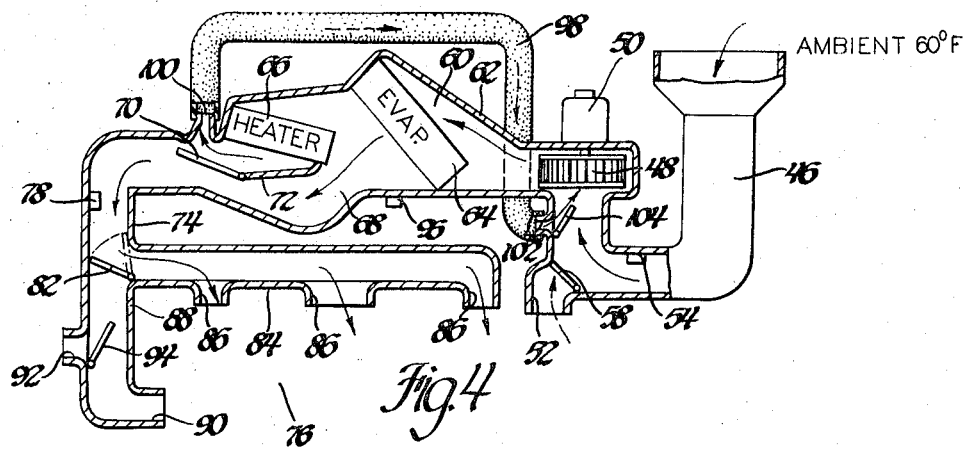

In FIG. 4, the heating and air conditioning system is operating when the ambient temperature is about 60°F. Air is introduced to blower fan 48 through the passage 46. The air then passes through evaporator 64 for cooling and dehydrating. The flow is then divided so that a portion of the air flows through bypass 68 and another portion flows through heater 66 for warming. The modulating temperature door 70 assumes the mid position illustrated for proportioning the air flow through the heater and the bypass to achieve a desired air temperature in the passenger compartment. Downstream from the door 70, the warmed and cooled air portions are mixed and the air passes through the upper outlet 86 into the passenger compartment 76. Under these conditions, the heat recirculating door 104 is opened slightly to permit a small quantity of heated air from the heater 66 to pass through hose 98 and evaporator 64. This helps maintain the evaporator temperature above 32°F. without an excessive flow restriction by closing of the suction throttling valve.

Figure 5:
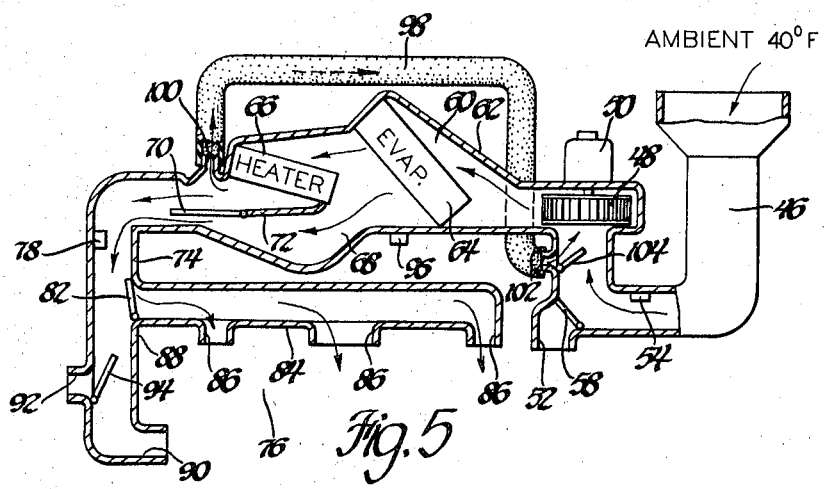

In FIG. 5, the heating and air conditioning system is operating when the ambient temperature is about 40°F. Under these conditions, air is drawn through passage 46 to the inlet of fan 48. The air then passes through evaporator 64 where it is cooled and de-humidified. The temperature door 70 directs a large portion of the air through the heater 66 for warming and a small portion of air to the bypass 68. Thus, a warmer air discharge temperature downstream from the temperature door 70 is produced. The air passes from the air distribution duct 74 into passenger compartment 76 through outlet 90. The heat recirculating door 104 causes a relatively large flow of heated air to flow through the hose 98 to the intake of the fan 48. This heated air significantly increases the heat load on the evaporator 64 and prevents its temperature from falling below 32°F. This prevents frost from forming on its finned surface. The evaporator's cooling capacity corresponds to line A in FIG. 2.

The heating and air conditioning system which is shown in FIG. 6 is operating when the ambient temperature is below 32°F. When this occurs, the ambient air sensor 54 signals the control assembly 56 which terminates compressor operation. Air is drawn through the passages 46 and 52 into fan 48. The air then passes through the evaporator 64. The temperature door 70 is positioned to cause substantially all the air to pass through heater 66 for maximum heating of the passenger compartment 76. The heated air then flows from the air distribution duct 74 into the passenger compartment 76 through the heater outlet 90 and the defroster outlet 92. The heat recirculating door 104 is opened slightly to cause some of the heated air from the heater 66 to pass through conduit 98 to the evaporator 64. The heated air passing through evaporator 64 warms the evaporator which has the effect of forcing oil out of the evaporator through the oil return line 44 and to the compressor.

In FIGS. 7–9, a second embodiment of the heating and air conditioning system is illustrated. As in the first embodiment, ambient air is drawn through an air inlet passage 46 past an ambient air sensor 54 to the inlet of a blower fan 48. Air is also drawn from the passenger compartment 76 through inlet 52 which is controlled by air doors 58. The air is discharged by the blower fan 48 into a duct 110 in which a heater 66 and evaporator 64 are supported. Unlike the first embodiment, however, the heater 66 is located upstream from the evaporator 64. The modulating temperature door 70 divides the air flow from the fan outlet either through heater 66 or around the heater through bypass 68. The air then passes through the duct 110 to the evaporator 64 as shown in FIG. 7 where it is cooled and dehumidified. The air then flows from evaporator 64 past the air discharge sensor 78 into the passenger compartment.

At ambient temperatures above 100°F. (see FIG. 7), air is drawn from the exterior of the automobile through inlet 46 and from the passenger compartment through inlet 52. Most of the air passes around the heater 66 and through evaporator 64 into the upper level distribution duct 84 and into the passenger compartment 76 through outlets 86.

At ambient temperature of about 40°F. (see FIG. 8), air is drawn through inlet 46 and past sensor 54 into fan 48. The air flow then divides and passes through heater 66 and bypass 68. An air door 82 directs the air flow between the lower level distribution duct 88 and another portion of duct 110 which encloses evaporator 64. Consequently, warm air from heater 66 passes into the passenger compartment 76 through the heater outlet 90 and defroster outlet 92. A defroster air door 94 regulates the amount of heated air directed against the windshield. A warm air discharge sensor 78' is positioned within duct 88 to sense the temperature of air discharged through the heater outlet 90. Under these low ambient temperature conditions, a portion of the heated air is allowed to flow past the air door 82 and through evaporator 64. This provides an additional heat load on the evaporator which prevents its temperature from falling below 32°F. Thus, frost is prevented from accumulating on the finned surface of the evaporator.

In FIG. 9, the heating and air conditioning system is shown operating at ambient temperatures below 32°F.

Sensor 54 signals the control assembly 56 to deactivate the compressor under these ambient temperature conditions. The air is then drawn through the inlet 46 and into fan 48. The air then passes through heater 66 and bypass 68 and into the lower distribution duct 88 for discharge into the passenger compartment 76 through the lower level heater outlet 90.

The upstream placement of heater 66 in FIGS. 7, 8, 9 allows more heat to be passed to evaporator 64 than in FIGS. 1–6. Because of this, a throttling valve 36 may be eliminated. Sufficient evaporator pressure to prevent freezing can be maintained by imposing a heat load on the evaporator by directing air from the heater to the evaporator.

Figure 10:
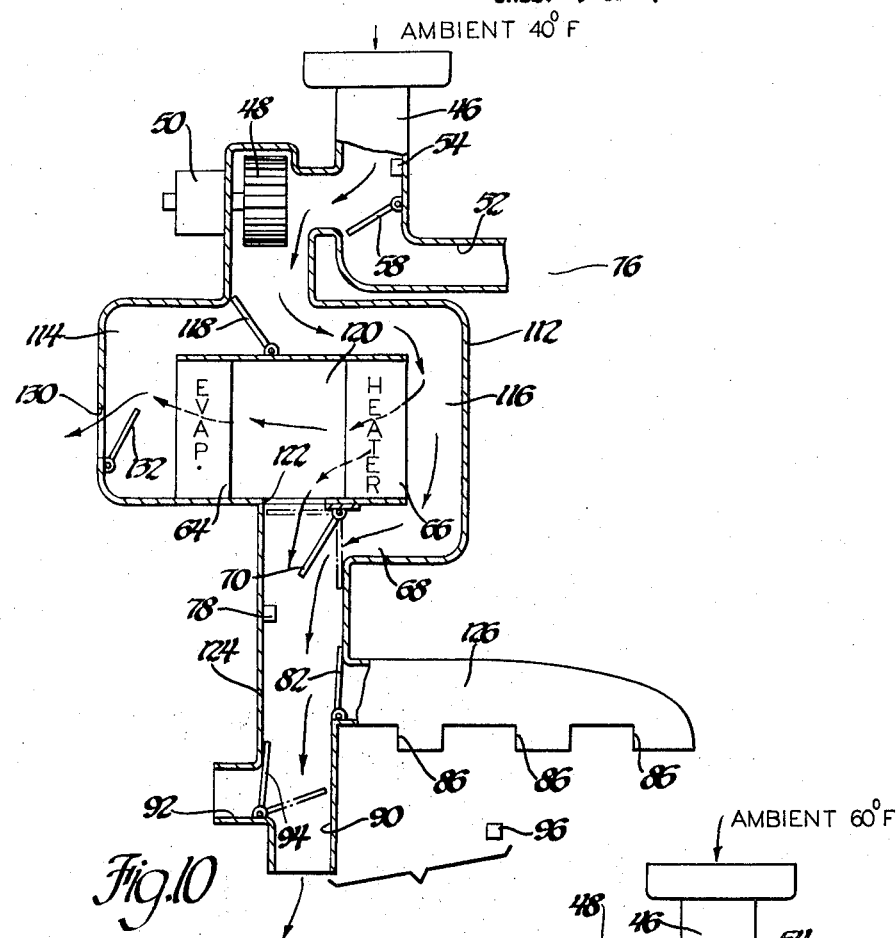
FIGS. 10–11 are like FIGS. 3-9 and illustrate another embodiment of the heating and air conditioning system having air flow controls.
Figure 11:
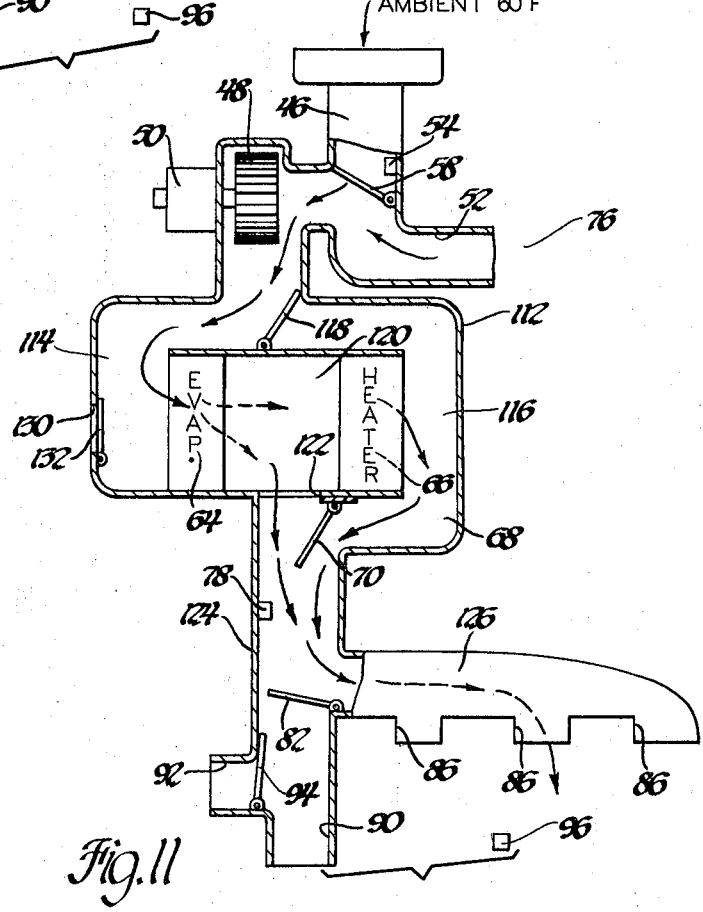

In FIGS. 10 and 11, a third embodiment of the heating and air conditioning system is illustrated. Air is drawn into the blower fan 48 through an air inlet passage 46 from atmosphere and a recirculating air inlet 52 from the passenger compartment. An ambient air sensor 54 senses the inlet air temperature and is connected to the control assembly as previously explained. The air from blower 48 passes into a duct 112 having parallel air passages 114 and 116 leading to the evaporator 64 and heater 66 respectively. Air flow from blower 48 is divided by a pivotal door 118 to flow to either evaporator 64 or heater 66. A bypass 68 conducts air around said heater 66 in response to the opening of an air temperature modulating door 70. The air which passes through evaporator 64 and heater 66 is discharged into a common passage 120 therebetween and then through an opening 122 into an air distribution duct 124. The air duct 124 has a lower level heater outlet 90 and defroster outlet 92. A separate outlet duct 126 leads to upper level outlets 86. An air door 82 directs air either toward the heater outlet 90 or the outlets 86. Also, a defroster door 94 directs hot air through outlet 92 against the windshield when opened.

When the heating and air conditioning system is operated at an ambient temperature around 40°F. as shown in FIG. 10, the fan 48 draws air in through inlet 46 and discharges it into the interior of duct 112. Air door 118 directs the air flow to heater 66 and bypass 68. The air door 70 proportions the air flow through heater 66 and bypass 68 to produce a desired in-car temperature as sensed by switches 78 and 96. The warmed air then passes through duct 124 to the passenger compartment. Some air from heater 66 passes through the evaporator 64 and out a purge door 130 when purge door 132 is open. This warms the evaporator to prevent freezing temperatures.

When the heating and air conditioning system is operated at ambient temperatures around 60°F., as shown in FIG. 11, the fan 48 draws air in through inlet 52 and first through evaporator 64. Purge door 132 is in a closed position under these conditions. The air then flows into ducts 124 and 126 for discharge into the passenger compartment through outlets 86. Some of the air is allowed to pass through heater 66 and passage 68 to produce a desired air discharge temperature in duct 124 as sensed by switch 78.

The arrangement of heater and evaporator in FIGS. 10, 11 is suitable for a clutchless air conditioning system in which the compressor is active whenever the ignition switch is on. Heater 66 supplies enough heat to maintain the pressure of evaporator 64 above a level corresponding to freezing temperatures. At low ambient temperatures, the re-cooled air from evaporator 64 passes through purge outlet 130 to atmosphere.

While the embodiments described and illustrated are preferred embodiments, other embodiments might be adapted.

What is claimed is as follows:

1. An automobile heating and air conditioning system with controls for operating the system during low ambient temperature conditions without freezing of the evaporator comprising: a refrigerating assembly including a compressor, a condenser, refrigerant expansion means and an evaporator for cooling air in an automobile passenger compartment; a heater warmed by engine coolant of the automobile; air passage duct means enclosing said heater and said evaporator and having inlet and outlet openings for receiving air from atmosphere and the automobile passenger compartment, modulating its temperature with said heater and evaporator and discharging the air back into the passenger compartment; air flow control means including air doors for directing heated air from said heater to said evaporator for preventing frost accumulation thereon which is caused by an insufficient capacity of the evaporator to absorb heat from air flowing therethrough at low ambient temperatures; a condition responsive sensor of the evaporator for controlling air flow under low ambient temperature conditions to prevent the evaporator temperature from falling below 32°F. by recirculating a quantity of heated air from said heater through the evaporator core.

2. An automobile heating and air conditioning system with air flow controls for operating the system during low ambient temperature conditions without freezing of the evaporator comprising: a refrigerating assembly including a compressor, a condenser, refrigerant expansion means and an evaporator for cooling air in an automobile passenger compartment; a heater warmed by engine coolant of the automobile; an air passage duct means enclosing said heater and said evaporator and having inlet openings in the other end for directing air first through said evaporator for cooling and dehumidifying and subsequently to said heater for warming prior to discharge into said passenger compartment; blower fan means before said evaporator and heater for passing air through said duct means; a recirculating air passage with an inlet downstream from said heater and an outlet upstream from said blower for recirculating warmed air from said heater through said evaporator; an air door for controlling the quantity of warmed air passing through said recirculating air passage; a condition responsive sensor operably connected to said air door for causing the air door to open and direct warmed air from said heater through said recirculating air passage and into said evaporator under low ambient temperature operation when the evaporator's cooling capacity is insufficient to absorb enough heat to prevent the evaporator temperature from falling below freezing.

* * * * *